(12) United States Patent
Zhang

(10) Patent No.: US 10,997,696 B2
(45) Date of Patent: May 4, 2021

(54) IMAGE PROCESSING METHOD, APPARATUS AND DEVICE

(71) Applicant: GUANGDONG OPPO MOBILE TELECOMMUNICATIONS CORP., LTD., Guangdong (CN)

(72) Inventor: Gong Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 94 days.

(21) Appl. No.: 16/173,951

(22) Filed: Oct. 29, 2018

(65) Prior Publication Data
US 2019/0164257 A1    May 30, 2019

(30) Foreign Application Priority Data
Nov. 30, 2017 (CN) .......................... 201711243724.9

(51) Int. Cl.
*G06T 5/00* (2006.01)
*G06T 5/50* (2006.01)
(Continued)

(52) U.S. Cl.
CPC .............. *G06T 5/002* (2013.01); *G06T 5/008* (2013.01); *G06T 5/50* (2013.01); *G06T 7/194* (2017.01);
(Continued)

(58) Field of Classification Search
None
See application file for complete search history.

(56) References Cited

U.S. PATENT DOCUMENTS 7,469,071 B2 * 12/2008 Drimbarean ............ G06T 5/003
382/254
8,115,818 B2 * 2/2012 Sawada ..................... G06T 5/50
348/208.13
(Continued)

FOREIGN PATENT DOCUMENTS

CN        1756313 A    4/2006
CN      104935911 A    9/2015
(Continued)

OTHER PUBLICATIONS

European Search Report in the European application No. 18201438.1, dated May 10, 2019.
(Continued)

*Primary Examiner* — Michelle M Entezari
(74) *Attorney, Agent, or Firm* — Ladas & Parry, LLP

(57) ABSTRACT

An image processing method, an apparatus and a device are provided. The method includes: a first image is captured according to a preset first exposure time and a second image is captured according to a second exposure time by using dual cameras; a first foreground area and a first background area of the first image are determined, and a second foreground area of the second image is determined; image fusion is performed on the second foreground area and the first foreground area to generate a third foreground area; and blurring processing is performed on the first background area, and the third foreground area and the first background area subjected to the blurring processing are composed to generate a target image.

13 Claims, 4 Drawing Sheets

(51) Int. Cl.
*G06T 7/194* (2017.01)
*G06T 7/50* (2017.01)
*H04N 5/225* (2006.01)
*H04N 5/235* (2006.01)
*H04N 13/25* (2018.01)
*H04N 5/222* (2006.01)
*H04N 5/232* (2006.01)

(52) U.S. Cl.
CPC ............. *G06T 7/50* (2017.01); *H04N 5/2226* (2013.01); *H04N 5/2258* (2013.01); *H04N 5/2355* (2013.01); *H04N 5/2356* (2013.01); *H04N 5/23229* (2013.01); *H04N 13/25* (2018.05); *G06T 2207/10024* (2013.01); *G06T 2207/10028* (2013.01); *G06T 2207/10144* (2013.01); *G06T 2207/20208* (2013.01); *G06T 2207/20221* (2013.01); *H04N 5/2353* (2013.01)

(56) References Cited

U.S. PATENT DOCUMENTS

| | | | | |
|---|---|---|---|---|
| 8,947,555 | B2* | 2/2015 | Velarde | H04N 9/735 348/223.1 |
| 9,131,150 | B1* | 9/2015 | Mangiat | H04N 5/2352 |
| 9,349,166 | B2* | 5/2016 | Muninder | H04N 5/23216 |
| 9,607,394 | B2 | 3/2017 | Yan et al. | |
| 9,690,458 | B2* | 6/2017 | Cheng | G06F 3/04815 |
| 10,264,193 | B2* | 4/2019 | Schaefer | G06T 5/008 |
| 10,453,185 | B2* | 10/2019 | Dal Mutto | H04N 13/254 |
| 10,498,963 | B1* | 12/2019 | Sorgi | G06T 7/11 |
| 2008/0166022 | A1* | 7/2008 | Hildreth | G06T 7/254 382/107 |
| 2010/0026831 | A1* | 2/2010 | Ciuc | G06K 9/00221 348/222.1 |
| 2011/0274420 | A1* | 11/2011 | Yasuda | G02B 7/36 396/125 |
| 2013/0169844 | A1* | 7/2013 | Watts | G06T 5/006 348/239 |
| 2013/0242057 | A1 | 9/2013 | Hong | |
| 2014/0009639 | A1* | 1/2014 | Lee | H04N 5/232 348/229.1 |
| 2014/0232830 | A1* | 8/2014 | Ichige | H04N 13/239 348/47 |
| 2015/0341620 | A1* | 11/2015 | Han | B60W 10/04 701/37 |
| 2016/0148343 | A1 | 5/2016 | Yan et al. | |
| 2016/0227100 | A1* | 8/2016 | Liu | H04N 5/23212 |
| 2017/0142312 | A1* | 5/2017 | Dal Mutto | H04N 13/239 |
| 2017/0332000 | A1* | 11/2017 | Wang | H04N 5/2254 |
| 2018/0089523 | A1* | 3/2018 | Itakura | G06T 7/11 |
| 2018/0139369 | A1* | 5/2018 | Chen | H04N 5/232127 |
| 2018/0227478 | A1 | 8/2018 | Li | |
| 2018/0336692 | A1* | 11/2018 | Wendel | G06K 9/209 |
| 2019/0243376 | A1* | 8/2019 | Davis | G05D 1/0212 |

FOREIGN PATENT DOCUMENTS

| | | |
|---|---|---|
| CN | 105100615 A | 11/2015 |
| CN | 105187722 A | 12/2015 |
| CN | 106357980 A | 1/2017 |
| CN | 106851123 A | 6/2017 |
| CN | 106851124 A | 6/2017 |
| CN | 106899781 A | 6/2017 |
| CN | 106937039 A | 7/2017 |
| CN | 106952222 A | 7/2017 |
| CN | 107018331 A | 8/2017 |
| CN | 107172353 A | 9/2017 |
| CN | 107241557 A | 10/2017 |
| CN | 107277356 A | 10/2017 |
| CN | 107948519 A | 4/2018 |
| JP | 2008233470 A | 10/2008 |
| JP | 2014131188 A | 7/2014 |

OTHER PUBLICATIONS

International search report in international application No. PCT/CN2018/111600, dated Jan. 22, 2019.
English translation of the written opinion of the international search authority in international application No. PCT/CN2018/111600, dated Jan. 22, 2019.
Second Office Action and search report of the Chinese application No. 201711243724.9, dated Nov. 4, 2019.
First Office Action of the Indian application No. 201814044161, dated Jul. 10, 2020.
First Office Action of the Korean application No. 10-2020-7008575, dated Dec. 17, 2020.

* cited by examiner

Slave image   Master image   Disparity map

Degrees of blurring of different areas in the first background area are determined according to the depth of field information — 201

Gaussian blurring processing is performed on the different areas in the first background area according to the degrees of blurring — 202

A                    A

IMAGE PROCESSING METHOD, APPARATUS AND DEVICE

CROSS-REFERENCE TO RELATED APPLICATION

The present application claims priority to Chinese Patent Application 201711243724.9, filed on Nov. 30, 2017, the contents of which are hereby incorporated by reference in its entirety.

BACKGROUND

The disclosure relates to the field of photographing technology, and in particular to an image processing method, an apparatus and a device.

Generally, in order to highlight a shot subject, a foreground area and a background area in an image are recognized and the background area is blurred. However, during capturing of an image, if brightness of a foreground is not appropriate, the subject in the image subjected to the blurring processing may not be highlighted. For example, if the shot subject is in a dark scene, an imaging effect is relatively poor, the brightness is quite low, and details are relatively fuzzy. After the background area is blurred, the shot subject still cannot be highlighted, and a visual effect achieved through the image processing is relatively poor.

In a related technology, to improve a visual effect achieved through the image processing, different exposure parameters are used for shooting to obtain multiple frames of images, and the multiple frames of images are composed to generate a high dynamic range image. However, a lot of time is required in both composite calculation and the process of capturing the multiple frames of images, which results in low generation efficiency of the high dynamic range image.

SUMMARY

The disclosure provides an image processing method and apparatus, and a device, capable of solving a technical problem in the related art that generation efficiency of a high dynamic range image is relatively low.

According to a first aspect, the embodiments of the present disclosure provide an image processing method, including the following operations. A first image is captured according to a preset first exposure time and a second image is captured according to a second exposure time by using dual cameras, wherein the second exposure time is determined according to brightness of a shooting scene and a preset threshold. A first foreground area and a first background area of the first image are determined, and a second foreground area of the second image is determined. Image fusion is performed on the second foreground area and the first foreground area to generate a third foreground area. Blurring processing is performed on the first background area, and the third foreground area and the first background area subjected to the blurring processing are composed to generate a target image.

According to a second aspect, the embodiments of the disclosure provide an image processing apparatus. The image processing apparatus may include a memory and a processor. The memory stores one or more computer programs that, when executed by the processor, cause the processor to implement the image processing method described in the first aspect.

According to a third aspect, the embodiments of the disclosure provide a non-transitory computer-readable storage medium, having stored thereon a computer program. The computer program, when executed by a processor, may cause the processor to implement the image processing method described in the first aspect.

BRIEF DESCRIPTION OF THE DRAWINGS

Based on the following description of embodiments with reference to the accompanying drawings, the above aspects and/or additional aspects and advantages of the disclosure become obvious and easy to understand.

DETAILED DESCRIPTION

The embodiments of the present disclosure are described below in detail. Examples of the embodiments are illustrated in the accompanying drawings. The same or similar numerals represent the same or similar elements or elements having the same or similar functions throughout the specification. The embodiments described below with reference to the accompanying drawings are exemplary, and are only used to explain the present disclosure but should not be construed as a limitation to the present disclosure.

An image processing method and apparatus, and a device according to the embodiments of the disclosure are described below with reference to the accompanying drawings.

According to the image processing method and apparatus, and the device provided in the embodiments of the disclosure, a first image is captured according to a preset first exposure time and a second image is captured according to a second exposure time by using dual cameras, wherein the second exposure time is determined according to brightness of a shooting scene and a preset threshold. A first foreground area and a first background area of the first image are determined, and a second foreground area of the second image is determined. Image fusion is performed on the second foreground area and the first foreground area to generate a third foreground area. Blurring processing is performed on the first background area, and the third foreground area and the first background area subjected to the blurring processing are composed to generate a target image. Therefore, generation efficiency and a visual effect of the high dynamic range image are improved.

The image processing method according to the embodiments of the disclosure may be executed by a terminal device. The terminal device may be a hardware device with dual cameras, such as a mobile phone, a tablet computer, a personal digital assistant, and a wearable device. The wearable device may be a smart band, a smartwatch, smart glasses or the like.

Figure 1:
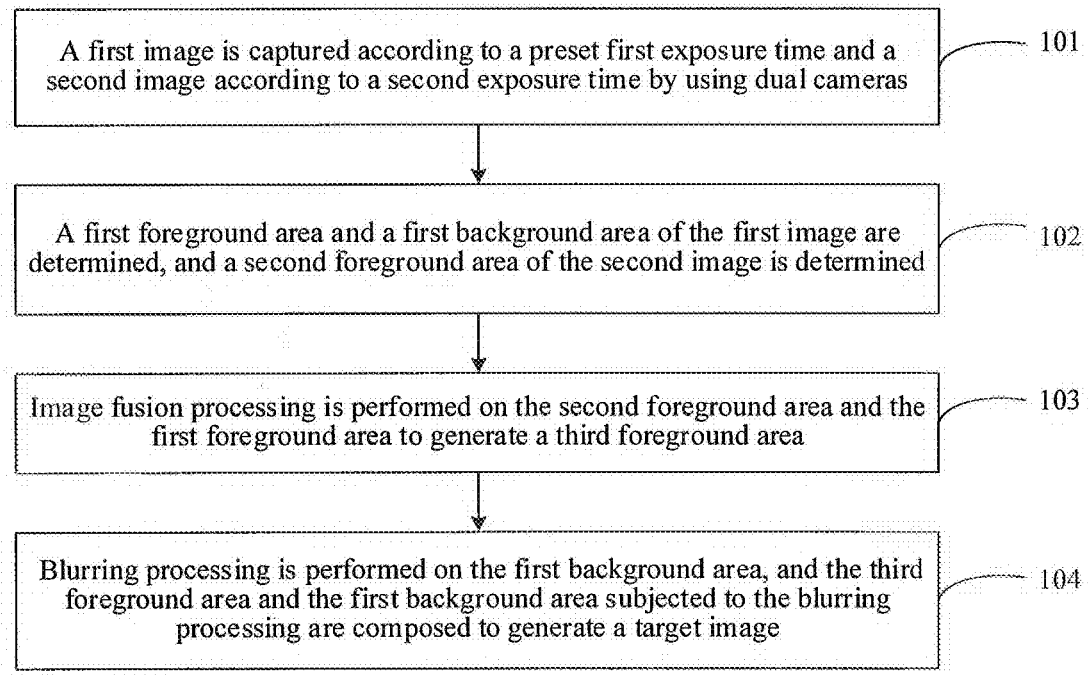
FIG. 1 is a flowchart of an image processing method according to an embodiment of the disclosure.

FIG. 1 is a flowchart of an image processing method according to an embodiment of the disclosure. As illustrated in FIG. 1, the image processing method includes operations at blocks 101 to 104.

At block 101, a first image is captured according to a preset first exposure time and a second image according to a second exposure time by using dual cameras.

In the embodiments of the disclosure, the second exposure time may be determined according to brightness of a shooting scene and a preset threshold. The dual cameras include a first camera and a second camera. In an example, the first camera is a primary camera and the second camera is a secondary camera. In another alternative example, the first camera is a secondary camera and the second camera is a primary camera. There are no limits made herein.

Figure 2:
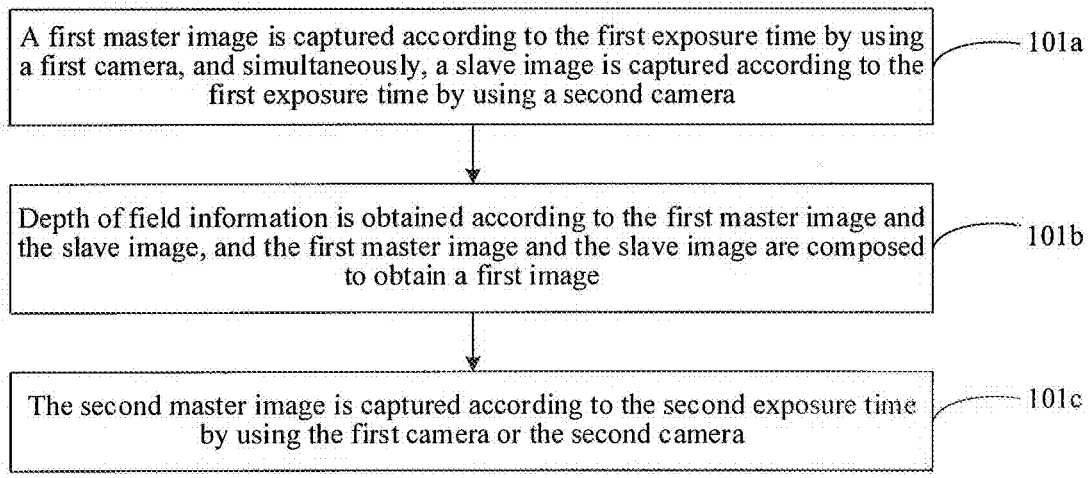
FIG. 2 is a flowchart of an image capturing method according to an embodiment of the disclosure.

In an embodiment of the disclosure, as illustrated in FIG. 2, the operation at block 101 includes actions at blocks 101a to 101c.

At block 101a, a first master image is captured according to the first exposure time by using a first camera, and simultaneously, a slave image is captured according to the first exposure time by using a second camera.

At block 101b, depth of field information is obtained according to the first master image and the slave image, and the first master image and the slave image are composed to obtain a first image.

Specifically, in the embodiment of the disclosure, the depth of field information is obtained according to the first master image and the slave image, and the depth of field information is used to determine a foreground area and a background area of the image. Therefore, the depth of field information may be a specific numerical value or may be a numerical range. In other words, to ensure that depth of field information available for distinguishing between the foreground area and the background area can be obtained, the first exposure time within which both the primary camera and the secondary camera are controlled to perform image capturing may be relatively short. In a specific setting implementation, the first exposure time may be set according to a processing capability of a terminal device and light sensitivity of the cameras. When the terminal device has a higher processing capability and the cameras have stronger light sensitivity, the first exposure time may be set to be shorter.

After a shot subject is focused, depth of field refers to a spatial depth range of generating a sharp image visible to human eyes before and after a focus area in which the subject is located.

It should be noted that in an actual application, human eyes mainly determine a depth of field through binocular vision. The principle of determining a depth of field through binocular vision is the same as a principle of determining a depth of field through dual cameras, which is mainly implemented by using a triangulation ranging principle illustrated in FIG. 3. Based on FIG. 3, in actual space, an imaging object, positions $O_R$ and $O_T$ of the two cameras, a focal plane on which the two cameras are located are illustrated, and a distance between the focal plane and a plane on which the two cameras are located is f. When the two cameras perform image capturing at a position of the focal plane, two shot images are obtained.

P and P' are positions of a same object in different shot images. A distance between the point P and a left side boundary of a shot image is $X_R$, and a distance between the point P' and a left side boundary of a shot image is $X_T$. $O_R$ and $O_T$ represent the two cameras. The two cameras are located on a same plane, and a distance between the two cameras is B.

Figure 3:
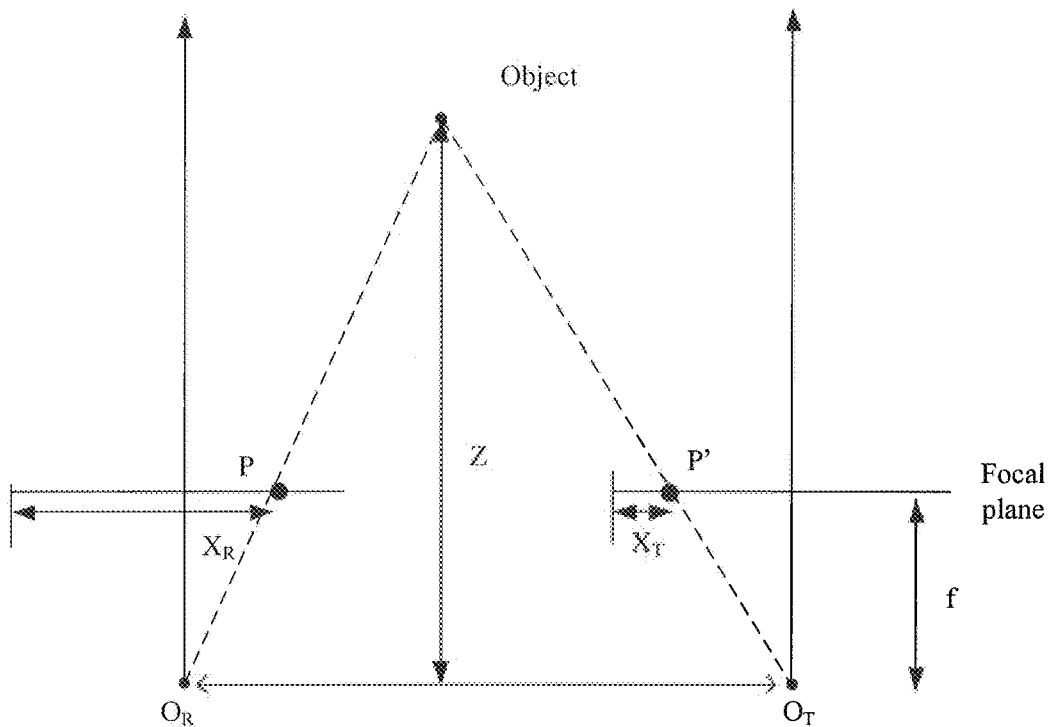
FIG. 3 is a schematic diagram of a triangulation ranging principle according to an embodiment of the disclosure.

Based on a triangulation ranging principle, for a distance Z between the object in FIG. 3 and the plane on which the two cameras are located, there is the following relationship:

$$\frac{B}{Z} = \frac{(B + X_T) - X_R}{Z - f}.$$

On this basis, it can be deduced that $$Z = \frac{B \cdot f}{X_R - X_T} = \frac{B \cdot f}{d},$$

where d is a distance difference between positions of the same object in different shot images. Because B and f are fixed values, the distance Z of the object can be determined according to d.

Figure 4:
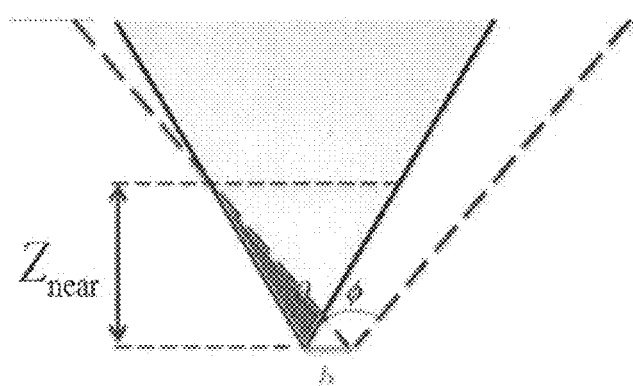
FIG. 4 is a schematic diagram of obtaining a depth of field by dual cameras according to an embodiment of the disclosure.

It should be emphasized that the above formulas are implemented based on two same parallel cameras, but there are actually many problems in actual use. For example, during calculation of the depth of field by using the two cameras illustrated in FIG. 2, there are always some scenes that cannot intersect with each other. Therefore, actually, to calculate the depth of field, FOV designs of the two cameras are different. The primary camera is configured to obtain a master image of an actual image, and a slave image obtained by the secondary camera is mainly used as a reference for calculation of the depth of field. Based on the analysis, field of view (FOV) of the secondary camera is generally larger than that of the primary camera. However, even in this case, as illustrated in FIG. 4, an object placed proximate to the cameras may not be imaged simultaneously in images obtained by the two cameras. An adjusted depth of field range calculation relationship is expressed as:

$$\varphi = 2\tan^{-1}\left(\frac{Z_{near} \cdot \tan(\theta/2) + b}{Z_{near}}\right).$$

Therefore, a depth of field range of a master image and the like may be calculated according to the adjusted formula.

In addition to the triangulation ranging method, other approaches may also be used to calculate a depth of field of the master image. For example, when the primary camera and the secondary camera perform image capturing of a same scene, a distance between an object in the scene and the camera is proportional to a displacement difference, a posture difference and the like generated during imaging by the primary camera and the secondary camera. Therefore, in an example of the disclosure, the distance Z may be obtained according to the proportion relationship.

Figure 5:
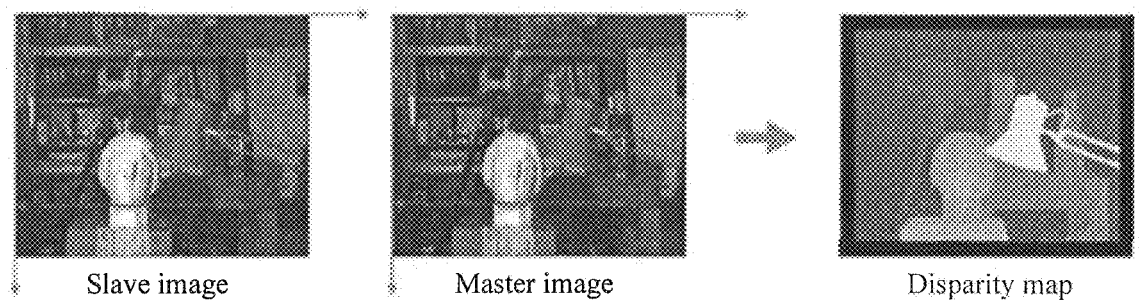
FIG. 5 is a flowchart of a background blurring processing method according to another embodiment of the disclosure.

For example, as illustrated in FIG. 5, disparity values of different points are calculated through a master image obtained by the primary camera and a slave image obtained by the secondary camera. In the example, the graph of disparity values is represented by a disparity map. The disparity map represents a displacement difference of a same point in two images, but because a displacement difference is directly proportional to Z in triangulation locating, a disparity map is most used as a depth of field map directly.

Further, after the depth of field information is obtained according to the first master image and the slave image, the first master image and the slave image are composed to obtain the first image, i.e., a composite image. It should be understood that information in the composite image is related to the primary camera and the secondary camera. When view angles of the primary camera and the secondary camera are the same, the composite image includes image information of the first master image and the slave image captured in the present scene, and the composite image includes more image information. When the primary camera and the secondary camera are a wide angle camera and a long-focus camera, respectively, the composite image includes information of a background with a large field of view and also includes large-scale image information of a shot subject.

At block 101c, the second master image is captured according to the second exposure time by using the first camera or the second camera.

In at least one embodiment of the disclosure, brightness of the present shooting scene is detected before determining the second exposure time.

It should be understood that exposure of a shot subject may be inaccurate in an image captured according to the preset first exposure time. For example, when image capturing is performed in a dark light scene, an imaging effect is poor as the first exposure time is relatively short, and the image of the shot subject is not sharp enough. Therefore, to obtain a shap image corresponding to the shot subject, image capturing is performed in an exposure mode again according to brightness of the current scene.

Specifically, the brightness of the shooting scene is detected. For example, brightness of the current shooting scene is detected by a luminance sensor in the terminal device. The second exposure time is determined according to the brightness and the preset threshold, and then the second master image is captured according to the second exposure time.

The preset threshold is used to determine whether the brightness of the current shooting scene is low, so as to avoid a case that a camera cannot capture images with high resolution of subjects in a scene with relatively low photosensitivity due to limitations of photosensitivity of the camera. The preset threshold is associated with photosensitivity of the camera. The higher the photosensitivity of the terminal device, the higher the preset threshold.

Specifically, in an embodiment of the disclosure, when it is determined by comparison that the brightness of the shooting scene is less than the preset threshold, the second exposure time is determined according to a preset algorithm and the brightness, wherein the second exposure time is longer than the first exposure time. In other words, when it is learned that the brightness of the current shooting scene is low, the second exposure time that is relatively long is determined by using the preset algorithm and the brightness, such that the imaging effect is improved by increasing a light amount.

In the embodiment, the preset algorithm may be set in advance according to a large amount of experimental data and may include a mathematical formula corresponding to a relationship between brightness of the scene and the second exposure time. In at least one alternative example, the preset algorithm may be a deep learning model set according to a large amount of experimental data. Input of the deep learning model is brightness of a current scene, and output thereof is the second exposure time. In at least one alternative example, the preset algorithm may be a list including a correspondence between brightness of a current scene and the second exposure time, so that after the brightness of the current scene is obtained, the second exposure time corresponding to the brightness may be obtained by querying the correspondence in the list.

In another embodiment of the disclosure, when it is determined by comparison that brightness of the current scene is greater than or equal to the preset threshold, it indicates that the brightness of the current scene falls within a range in which sharp imaging of the camera is implemented. In this case, a normal shooting mode may be stared, and a preset exposure time corresponding to the normal shooting mode may be directly used as the second exposure time.

At block 102, a first foreground area and a first background area of the first image are determined, and a second foreground area of the second image is determined.

Specifically, according to different application scenarios, there are different manners of determining the first foreground area and the first background area of the first image according to the depth of field information. Examples are described as follows.

First Example

Parameters associated with the image capturing may be obtained to calculate depth of field information in an image area outside a focal area of a target area according to a depth of field formula related to a camera for shooting.

In the example, a diameter of a permissible circle of confusion, an aperture value, a focal length, a focusing distance and other parameters of the shooting camera may be obtained. Depth of field of a first foreground area may be calculated according to the following formula: depth of field information of the first foreground area=(aperture value*diameter of the permissible circle of confusion*square of the focal distance)/(square of the focal length+aperture value*diameter of the permissible circle of confusion*focusing distance), separate the first foreground area from the first image according to the calculated depth of field of the first foreground area. Depth of field information of the first background area of the first image may be calculated according to the following formula: depth of field information of the first background area=(aperture value*diameter of the permissible circle of confusion*square of the focusing distance)/(square of the focal length−aperture value*diameter of the permissible circle of confusion*focusing distance). Then, the first background area of the first image may be determined according to the calculated depth of field information of the first background area.

Second Example

A depth of field map of an image area outside a focus area is determined according to the depth of field data information, obtained by dual cameras, of a first image. A first foreground area before the focus area and a first background area after the focus area are determined according to the depth of field map.

Specifically, in the example, positions of the two cameras are different, and thus there are a specific angle difference and distance difference between the two rear cameras with respect to a target object to be shot. Therefore, there is also a specific phase difference between preview image data obtained by the two cameras. In at least one example, the cameras may be two rear cameras in the terminal device.

For example, for a point A of the shot target object, in preview image data of a camera 1, pixel coordinates corresponding to the point A is (30, 50), and in preview image data of a camera 2, pixel coordinates corresponding to the point A is (30, 48). A phase difference of the pixels corresponding to the point A in the two pieces of preview image data is 50−48=2.

In this example, a correspondence between depth of field information and a phase difference may be established in advance according to experimental data or camera parameters. Therefore, depth of field information of pixels in the first image may be searched according to a phase difference of each pixel in the composite image in the preview image data obtained by the two cameras.

For example, for a phase difference of 2 corresponding to the point A, if it is determined according to the preset correspondence that a corresponding depth of field is 5 meters, depth of field information corresponding to the point A in a target area is 5 meters. Therefore, depth of field information of each pixel in the first image may be obtained, that is, the depth of field map of the image area outside the focal area may be obtained.

After the depth of field map of the image area outside the focal area is obtained, depth of field information of the first foreground area of an image area before the focus area and depth of field information of the first background area after the focus area may be further determined.

It should be noted that, in the embodiment of the disclosure, after the first foreground area and the first background area of the first image are determined according to the depth of field information, the first foreground area and the first background area may be further marked in order to facilitate processing on the first foreground area and the like. For example, the first foreground area is marked as fore_gt, and the first background area is marked as back_gt.

At block 103, image fusion processing is performed on the second foreground area and the first foreground area to generate a third foreground area.

At block 104, blurring processing is performed on the first background area, and the third foreground area and the first background area subjected to the blurring processing are composed to generate a target image.

Specifically, based on the above analysis, an image of a foreground area in the second master image obtained through exposure according to the brightness of the current scene is relatively sharp. In this case, the second foreground area of the second master image is obtained according to the coordinate information of the first foreground area, and the third foreground area of the high dynamic range image may be generated by performing image fusion processing on the second foreground area and the first foreground area.

In at least one example of the disclosure, when a coordinate position of the second image fore_gt2 is marked based on a coordinate position of the first foreground area fore_gt marked in the first image, image fusion is performed on images of fore_gt and fore_gt2 in a manner of high-dynamic-range image calculation and then the third foreground image is obtained. In this case, the obtained third foreground image is a high dynamic range image.

In the disclosure, an image with a sharp foreground area may be obtained by capturing only the second image according to the second exposure time. Only one of the dual cameras, such as a primary camera is started during second exposure, that is, the second image is captured according to the second exposure time by using the primary camera. In this way, power consumption is reduced. In addition, when the primary camera is an optical image stabilization lens, that is, the second image is captured according to the second exposure time by using the OIS optical image stabilization lens, pixel alignment is more accurate during image fusion of the first image and the second image, an imaging effect of the foreground area of the high dynamic range image is better, and the image has richer details.

Further, blurring processing is performed on the background area according to the depth of field information, and the third foreground area of the high dynamic range image and the first background area subjected to the blurring processing are composed to generate a target image. The target image has a highlighted foreground and a better visual effect.

It should be understood that, since blurring processing needs to be performed on the first background area, image fusion processing is merely performed on the first image obtained after two exposures and the foreground area of the second image. In this case, a calculation amount is greatly reduced compared with fusion of the entire first image and the entire second image. As the second image obtained after the two exposures has relatively high quality, when the second image is blurred subsequently, a shot subject in the foreground area may be highlighted. In addition, blurring processing is performed directly according to the image, obtained after a first exposure, of the background area, so as to avoid new noise resulting from the background fusion.

It should be further noted that, according to different application scenarios, blurring processing may be performed on the background area according to the depth of field information in multiple different implementations. Examples are described as follows.

First Example

Figure 6:
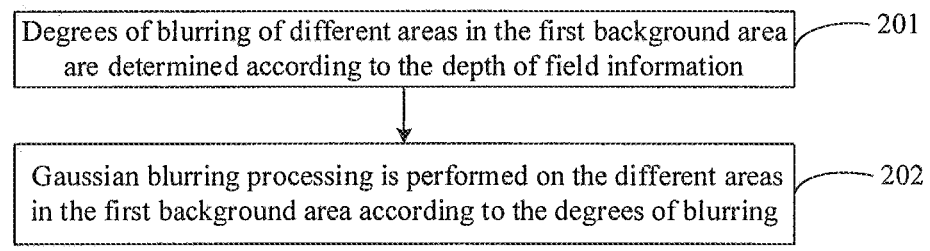
FIG. 6 is a flowchart of an image processing method according to another embodiment of the disclosure.

As illustrated in FIG. 6, the operation at block 104 includes actions at block 201 and block 202.

At block 201, degrees of blurring of different areas in the first background area are determined according to the depth of field information.

It should be understood that the first background area is divided into different areas for determining degrees of blurring, so as to avoid that depth of field information obtained according to pixels in a master image and a slave image is not accurate, wherein the master image and the slave image are determined according to the first exposure time that is relatively short. In the embodiment, depth of field information of a respective area may be determined according to a distribution probability of depth of field information of multiple pixels in different areas of the first background area, so as to determine degrees of blurring of the different areas.

In 202, Gaussian blurring processing is performed on the different areas in the first background area according to the degrees of blurring.

Specifically, the degrees of blurring of the different areas of the first background area are determined according to the depth of field information, and Gaussian blurring processing is performed on the different areas of the first background area according to the degrees of blurring, such that the depth of field information becomes larger. When the depth of field information is larger, a degree of blurring is higher, so that gradient blurring is achieved.

Second Example

Figure 7:
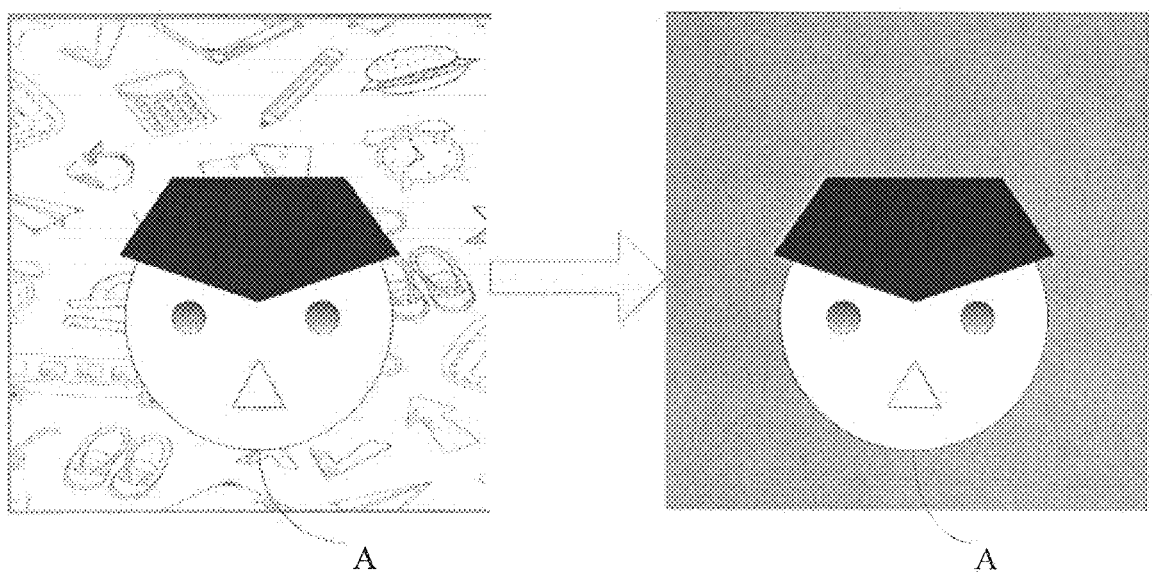
FIG. 7 is a diagram of a process of generating a target image according to an embodiment of the disclosure.

After the first background area is determined according to the depth of field information, when scene information of the first background area is complex, for example, there are a large number of pixels or color components exceed a specific value, background replacement may be performed on the first background area to highlight a shot subject. The first background area with complex scene information may be replaced with a background area that includes preset scene information, such as, replacing with a blank background. As illustrated in a left image of FIG. 7, when a person A is shot, if a background area of an image is complex, blurring processing is performed on the background area as illustrated in a right image of FIG. 7, so that in a processed target image, not only the person A is highlighted, but also the background area is not excessively complex and affects user's visual experience.

Therefore, according to the image processing method in the embodiments of the disclosure, a double-exposure mode is adopted, a depth image may be obtained by using a first short exposure to segment a foreground area and a background area, the second exposure time is controlled through the scene recognition and a single lens is used in a second exposure, and HDR fusion is performed on a foreground area obtained through the segmentation in the second exposure and the foreground area obtained through the segmentation in the first exposure, so as to highlight a subject, reduce noise, and enhance image sharpness in a dark environment. In addition, for processing on the background area obtained by using the first exposure, only background blurring is performed on a first-frame image, thereby reducing the computation amount and improving the real-time performance. The high dynamic range image may be obtained only through the two exposures, without obtaining multiple exposures and then performing composition. Therefore, generation efficiency of the high dynamic range image is improved.

In conclusion, according to the image processing method in the embodiments of the disclosure, the first master image is captured according to the preset first exposure time by the first camera, and simultaneously, the slave image is captured according to the first exposure time by the second camera. The depth of field information is obtained according to the first master image and the slave image and the first master image and the slave image are composed to obtain the first image. The first foreground area and the first background area of the first image are determined according to the depth of field information. The brightness of the shooting scene is detected, the second exposure time is determined according to the brightness and the preset threshold, and the second image is captured according to the second exposure time. The second foreground area of the second image is obtained according to the coordinate information of the first foreground area, and image fusion processing is performed on the second foreground area and the first foreground area to generate the third foreground area of the high dynamic range image. Blurring processing is performed on the first background area according to the depth of field information, and the third foreground area and the first background area subjected to the blurring processing are composed to generate the target image. Therefore, generation efficiency and a visual effect of the high dynamic range image are improved.

Figure 8:
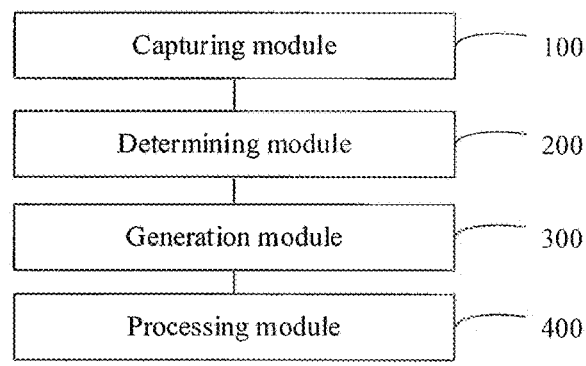
FIG. 8 is a schematic structure diagram of an image processing apparatus according to an embodiment of the disclosure.

To implement the foregoing embodiments, the disclosure further provides an image processing apparatus, which may be applied into a terminal device. FIG. 8 is a schematic structure diagram of an image processing apparatus according to an embodiment of the disclosure. As illustrated in FIG. 8, the image processing apparatus includes a capturing module 100, a determining module 200, a generation module 300, and a processing module 400.

The capturing module 100 may be configured to capture a first image according to a preset first exposure time and a second image according to a second exposure time by using dual cameras. The second exposure time may be determined according to brightness of a shooting scene and a preset threshold.

The determining module 200 may be configured to determine a first foreground area and a first background area of the first image and determine a second foreground area of the second image.

The generation module 300 may be configured to perform image fusion processing on the second foreground area and the first foreground area to generate a third foreground area.

In an example, the third foreground area may be a foreground area of a high dynamic range image that is generated by performing image fusion on the second foreground area and the first foreground area in a manner of high-dynamic-range image calculation.

The processing module 400 may be configured to perform blurring processing on the background area, and compose the third foreground area and the first background area subjected to the blurring processing to generate a target image.

In at least one embodiment of the disclosure, the capturing module 100 may specifically be configured to detect brightness of the present shooting scene.

In at least one embodiment of the disclosure, the capturing module 100 may specifically be configured to: according to a result of comparison that the brightness is less than the preset threshold, determine the second exposure time according to a preset algorithm and the brightness. In the example, the second exposure time is longer than the first exposure time.

In at least one embodiment of the disclosure, the capturing module 100 may specifically be configured to: according to a result of comparison that the brightness is greater than or equal to the preset threshold, start a normal shooting mode, and use a preset exposure time corresponding to the normal shooting mode as the second exposure time.

In at least one embodiment of the disclosure, the dual cameras include a first camera and a second camera, and the capturing module 100 may specifically be configured to: capture a first master image according to the first exposure time by using a first camera and capture a slave image according to the first exposure time by using a second camera simultaneously. The image processing apparatus may further include a obtaining module, configured to obtain depth of field information according to the first master image and the slave image, and compose the first master image and the slave image to obtain the first image.

It should be noted that the foregoing description of the method embodiments is also applicable to the apparatus in the embodiment of the disclosure. Implementation principles thereof are similar and details are not repeated herein.

Division of the modules in the foregoing image processing apparatus is only used for illustration. In other embodiments of the disclosure, the image processing apparatus may be divided into different modules as required, to complete all or some of functions of the foregoing image processing apparatus.

In conclusion, according to the image processing apparatus in the embodiments of the disclosure, the first master image is captured according to the preset first exposure time by using the first camera, and simultaneously, the slave image is captured according to the first exposure time by using the second camera. The depth of field information is obtained according to the first master image and the slave image, and the first master image and the slave image are composed to obtain the first image. The first foreground area and the first background area of the first image are determined according to the depth of field information. The brightness of the shooting scene is detected, the second exposure time is determined according to the brightness and the preset threshold, and the second image is captured according to the second exposure time. The second foreground area of the second image is obtained according to the coordinate information of the first foreground area, and image fusion processing is performed on the second foreground area and the first foreground area to generate the third foreground area. Blurring processing is performed on the first background area according to the depth of field information, and the third foreground area and the first background area subjected to the blurring processing are composed to generate the target image. Therefore, generation efficiency and a visual effect of the high dynamic range image are improved.

Figure 9:
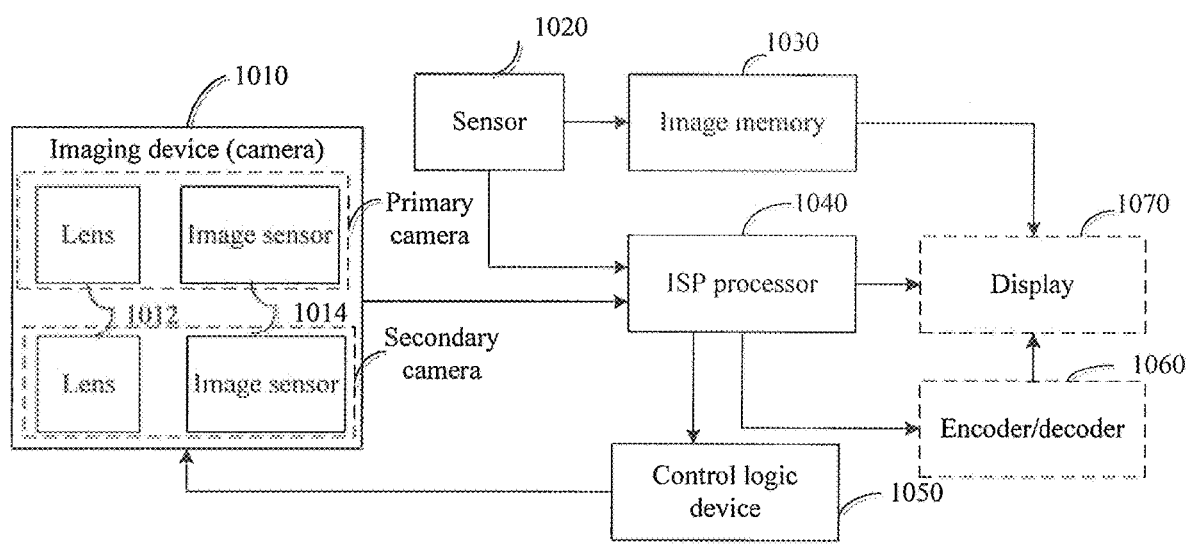
FIG. 9 is a schematic diagram of an image processing c according to an embodiment of the disclosure.

To implement the foregoing embodiments, the disclosure further provides a computer device, such as the terminal device in the above embodiment of the disclosure. The computer device may be any device that includes a memory storing a computer program and a processor running the computer program. For example, the computer device may be a smartphone, a personal computer or the like. The computer device further includes an image processing circuit. The image processing circuit may be implemented by a hardware component and/or a software component, and may include various processing units for defined ISP (Image Signal Processing) pipelines. FIG. 9 is a schematic diagram of an image processing circuit according to an embodiment of the disclosure. As illustrated in FIG. 9, for ease of description, only aspects of the image processing related to the embodiments of the disclosure are illustrated.

As illustrated in FIG. 9, the image processing circuit includes an ISP processor 1040 and a control logic device 1050. Image data captured by an imaging device 1010 is processed by the ISP processor 1040 firstly, and the ISP processor 1040 analyzes the image data to capture image statistical information that may be used for determining one or more control parameters of the imaging device 1010. The imaging device 1010 (camera) may include a camera having one or more lenses 1012 and an image sensor 1014. To implement a background blurring processing method in the disclosure, the imaging device 1010 includes two cameras. Still referring to FIG. 8, the imaging device 1010 may simultaneously capture scene images through a primary camera and a secondary camera, and the image sensor 1014 may include a color filter array (for example, a Bayer filter). The image sensor 1014 may obtain light intensity and wavelength information that are captured by each image pixel of the image sensor 1014, and provide a set of original image data that may be processed by the ISP processor 1040. A sensor 1020 may provide the original image data to the ISP processor 1040 based on an interface type of the sensor 1020. The ISP processor 1040 may calculate depth of field information and the like based on original image data obtained by the image sensor 1014 in the primary camera and original image data obtained by the image sensor 1014 in the secondary camera, both of which are provided by the sensor 1020. An interface of the sensor 1020 may be an SMIA (Standard Mobile Imaging Architecture) interface, another serial or parallel camera interface or a combination of the foregoing interfaces.

The ISP processor 1040 may perform pixel-by-pixel processing on the original image data in multiple formats. For example, each image pixel may have a bit depth of 8, 10, 12, or 14 bits, and the ISP processor 1040 may perform one or more image processing operations on the original image data and collect statistical information related to the image data. The image processing operation may be performed according to same or different bit-depth precision.

The ISP processor 1040 may further receive pixel data from an image memory 1030. For example, the original pixel data is sent from the interface of the sensor 1020 to the image memory 1030, and then the original pixel data in the image memory 1030 is provided to the ISP processor 1040 for processing. The image memory 1030 may be a part of a memory device, a storage device, or a separate dedicated memory in an electronic device, and may include a DMA (Direct Memory Access, direct memory access) feature.

When receiving the original image data from the interface of the sensor 1020 or from the image memory 1030, the ISP processor 1040 may perform one or more image processing operations, such as time-domain filtering. Processed image data may be sent to the image memory 1030 for additional processing before being displayed. The ISP processor 1040 receives the processed data from the image memory 1030, and performs image data processing on the processed data in an original domain and color space of RGB and YCbCr. The processed image data may be output to a display 1070 for viewing by a user and/or further processing by a graphics engine or a CPU (Graphics Processing Unit). In addition, output of the ISP processor 1040 may also be sent to the image memory 1030, and the display 1070 may read image data from the image memory 1030. In an embodiment, the image memory 1030 may be configured to implement one or more frame buffers. In addition, the output of the ISP processor 1040 may be sent to an encoder/decoder 1060 for encoding/decoding image data. Encoded image data may be stored and decompressed before being displayed on the display 1070. The encoder/decoder 1060 may be implemented by a CPU, a GPU or a coprocessor.

Statistical data determined by the ISP processor 1040 may be sent to the control logic device 1050. For example, the statistical data may include statistical information of the image sensor 1014, such as statistical information of automatic exposure, automatic white balance, automatic focusing, flicker detection, black level compensation, and shading correction of the lens 1012. The control logic device 1050 may include a processor and/or microcontroller that perform one or more routines (such as firmware). One or more routines may be used to determine control parameters of the imaging device 1010 and control parameters of other elements according to the received statistical data. For example, the control parameters may include control parameters of the sensor 1020 (for example, a gain and an integral time of exposure control), a flash control parameter of a camera, control parameters of the lens 1012 (for example, a focal length for focusing or zooming), or a combinations of these parameters. ISP control parameters may include a gain level and a color correction matrix used for automatic white balance and color adjustment (for example, during RGB processing), and a shading correction parameter of the lens 1012.

The following provides operations of an image processing method implemented by using the image processing circuit in FIG. 9.

A first image may be captured according to a preset first exposure time and a second image may be captured according to a second exposure time by using dual cameras, wherein the second exposure time is determined according to brightness of a shooting scene and a preset threshold.

A first foreground area and a first background area of the first image may be determined and a second foreground area of the second image may be determined.

Image fusion processing may be performed on the second foreground area and the first foreground area to generate a third foreground area.

Blurring processing may be performed on the first background area, and the third foreground area and the first background area subjected to the blurring processing may be composed to generate a target image.

To implement the foregoing embodiments, the disclosure further provides a non-transitory computer-readable storage medium. An instruction in the storage medium, when executed by a processor, may cause the processor to implement the image processing method in the foregoing embodiments of the disclosure.

In the description of the specification, the terms "one embodiment", "some embodiments", "an example", "a specific example", "some examples" or the like mean that specific characteristics, structures, materials, or features described with reference to the embodiment or example are included in at least one embodiment or example of the disclosure. In the specification, schematic representation of the foregoing terms does not necessarily be used for a same embodiment or example, and the specific characteristics, structures, materials or features described can be combined in an appropriate manner in any one or more embodiments or examples. In addition, different embodiments or examples described in the specification of the disclosure may be combined with features of the different embodiments or examples by those skilled in the art may combine without contradictions.

In addition, terms "first" and "second" are merely only for the purpose of description, but not be understood as indicating or implying relative importance or implicitly indicating a quantity of technical features. Therefore, features defined by "first" and "second" may explicitly or implicitly include at least one of the features. The term "a plurality of" in the present disclosure means at least two, such as, two, three and so on, unless otherwise clearly and specifically limited.

Description of a flowchart or any process or method described herein in another manner can be understood as expression of one or more modules, fragments, parts of code that contains an executable instruction for implementing a custom logic function or operations of the process, and preferred implementations of the disclosure include other implementations. Functions may not be performed in an order indicated or discussed, including in a substantially simultaneous manner or in an opposite order according to the functions. This shall be understood by thoses skilled in the art of the embodiments of the disclosure.

Logic and/or operations indicated in a flowchart or described herein in another manner, for example, may be considered to be a sequence table of an executable instruction for implementing logic functions, and may be specifically implemented in any computer-readable medium for use by an instruction execution system, apparatus, or device (such as a computer-based system, a system including a processor, or another system that may obtain an instruction from the instruction execution system, apparatus, or device and execute the instruction), or for use by a combination of the instruction execution system, apparatus, or device. In the specification, the "computer-readable medium" may be any apparatus that may include, store, communicate with, propagate, or transmit a program for use by the instruction execution system, apparatus, or device or for use by a combination of the instruction execution system, apparatus, or device. More specific examples (an exhaustive list) of the computer-readable medium may include the following: an electrical connection part (electronic device) with one or more wirings, a portable computer disk box (magnetic device), a random access memory (RAM), a read-only memory (ROM), an erasable programmable read only memory (EPROM or flash memory), an optical fiber apparatus, and a portable compact disk read only memory (CDROM). In addition, the computer-readable medium even may be paper on which the program can be printed or other suitable medium, because, for example, the program may be obtained in an electrical manner by performing optical scanning on the paper or another media and then performing editing and interpretation or performing processing in another suitable manner if necessary, and then the program may be stored in a computer memory.

It should be understood that the parts of the disclosure may be implemented by using hardware, software, firmware, or a combination thereof. In the foregoing implementations, multiple operations or methods may be implemented by software or firmware that is stored in a memory and that is executed by an appropriate instruction execution system. For example, if hardware is used to implement a same implementation as another implementation, any one or a combination of the following technologies known in the art may be used: a discrete logic circuit including a logic gate circuit for performing a logic function on a data signal, an dedicated integrated circuit including an appropriate combinatorial logic gate circuit, a programmable gate array (PGA), a field programmable gate array (FPGA) and the like.

Those of ordinary skilled in the art can understand that all or part of the operations in methods of the embodiments may be completed by related hardware instructed by a program. The program may be stored in a computer-readable memory. When being executed, the program is used for implementing one of the operations or a combination of the operations of the method of the embodiments.

In addition, each functional unit in each embodiment of the disclosure may be integrated into a processing module, each module may also physically exist independently, and two or more than two module s may also be integrated into a module. The integrated module may be implemented in a hardware form and may also be implemented in form of software functional unit. When being implemented in form of software functional module and sold or used as an independent product, the integrated module may be stored in a computer-readable memory.

The storage medium mentioned above may be a read-only memory, a magnetic disk, an optical disc or the like. Although the embodiments of the disclosure have been illustrated and described above, it can be understood that the foregoing embodiments are exemplary and shall not be understood as limitations on the disclosure. Those of ordinary skill in the art can make alterations, modifications, alterations, replacements, or variations on the above embodiments within the scope of the disclosure.

The invention claimed is:

1. An image processing method, applied in a terminal device and comprising:
  capturing a first master image according to a first exposure time by using a first camera, and capturing a slave image according to the first exposure time by using a second camera simultaneously; and composing the first master image and the slave image to obtain a first image;
  responsive to a result of comparison that brightness of a shooting scene is less than a preset threshold, determining a second exposure time according to a preset algorithm and the brightness, wherein the second exposure time is longer than the first exposure time;
  responsive to a result of comparison that the brightness is greater than or equal to the preset threshold, starting a normal shooting mode and determining the second exposure time as a preset exposure time corresponding to the normal shooting mode;
  capturing a second master image according to the second exposure time by using the first camera or the second camera;
  determining a first foreground area and a first background area of the first image and determining a second foreground area of the second master image;
  performing image fusion processing on the second foreground area and the first foreground area to generate a third foreground area, the third foreground area being of a high dynamic range image; and
  performing blurring processing on the first background area, and composing the third foreground area and the first background area subjected to the blurring processing to generate a target image which is the high dynamic range image.

2. The method according to claim 1, wherein determining the first foreground area and the first background area of the first image comprises:
  calculating depth of field information of the first foreground area and depth of field information of the first background area according to shooting parameters and depth of field calculation formulas;
  separating the first foreground area from the first image according to the depth of field information of the first foreground area; and
  determining the first background area of the first image according to the depth of field information of the first background area.

3. The method according to claim 1, wherein determining the first foreground area and the first background area of the first image comprises:
  calculating a phase difference of each pixel in the first image by using preview image data obtained by the cameras;
  obtaining depth of field information of each pixel according to a predetermined correspondence between depth of field information and a phase difference and the calculated phase difference of each pixel to generate a depth of field map of the first image;
  determining depth of field information of the first foreground area and depth of field information of the first background area according to the depth of field map;
  separating the first foreground area from the first image according to the depth of field information of the first foreground area; and
  determining the first background area of the first image according to the depth of field information of the first background area.

4. The method according to claim 1, wherein determining the second foreground area of the second master image comprises:
  obtaining the second foreground area according to coordinate information of the first foreground area.

5. The method according to claim 1, wherein performing the blurring processing on the first background area comprises:
  obtaining depth of field information of the first image;
  determining degrees of blurring of different areas of the first background area according to the depth of field information; and
  performing Gaussian blurring processing on the different areas of the first background area according to the degrees of blurring.

6. The method according to claim 1, wherein performing the blurring processing on the first background area comprises:
  determining whether scene information of the first background area meets a preset condition; and
  responsive to determining that the scene information of the first background area meets the preset condition, replacing the first background area with a background area that includes preset scene information.

7. The method according to claim 6, wherein the preset condition comprises at least one of:
  a number of pixels in the first background area exceeding a first threshold; or
  color components in the first background area exceeding a second threshold.

8. An image processing apparatus, applied into a terminal device and comprising: a memory and a processor, the memory storing one or more computer programs that, when executed by the processor, cause the processor to execute an image processing method, the method comprising:
  capturing a first master image according to a first exposure time by using a first camera, and capturing a slave image according to the first exposure time by using a second camera simultaneously; and composing the first master image and the slave image to obtain a first image;
  responsive to a result of comparison that the brightness of a shooting scene is less than a preset threshold, determining a second exposure time according to a preset algorithm and the brightness, wherein the second exposure time is longer than the first exposure time;
  responsive to a result of comparison that the brightness is greater than or equal to the preset threshold, starting a normal shooting mode and determining the second exposure time as a preset exposure time corresponding to the normal shooting mode;
  capturing a second master image according to the second exposure time by using the first camera or the second camera;
  determining a first foreground area and a first background area of the first image and determining a second foreground area of the second master image;
  performing image fusion processing on the second foreground area and the first foreground area to generate a third foreground area, the third foreground area being of a high dynamic range image; and
  performing blurring processing on the first background area, and composing the third foreground area and the first background area subjected to the blurring processing to generate a target image which is the high dynamic range image.

9. The apparatus according to claim 8, wherein determining the first foreground area and the first background area of the first image comprises:
calculating depth of field information of the first foreground area and depth of field information of the first background area according to shooting parameters and depth of field calculation formulas;
separating the first foreground area from the first image according to the depth of field information of the first foreground area; and
determining the first background area of the first image according to the depth of field information of the first background area.

10. The apparatus according to claim 8, wherein determining the first foreground area and the first background area of the first image comprises:
calculating a phase difference of each pixel in the first image by using preview image data obtained by the cameras;
obtaining depth of field information of each pixel according to a predetermined correspondence between depth of field information and a phase difference and the calculated phase difference of each pixel to generate a depth of field map of the first image;
determining depth of field information of the first foreground area and depth of field information of the first background area according to the depth of field map;
separating the first foreground area from the first image according to the depth of field information of the first foreground area; and
determining the first background area of the first image according to the depth of field information of the first background area.

11. The apparatus according to claim 8, wherein performing the blurring processing on the first background area comprises:
obtaining depth of field information of the first image;
determining degrees of blurring of different areas of the first background area according to the depth of field information; and
performing Gaussian blurring processing on the different areas of the first background area according to the degrees of blurring.

12. The apparatus according to claim 8, wherein performing the blurring processing on the first background area comprises:

determining whether scene information of the first background area meets a preset condition; and
responsive to determining that the scene information of the first background area meets the preset condition, replacing the first background area with a background area that includes preset scene information;
wherein the preset condition comprises at least one of a number of pixels in the first background area exceeding a first threshold, or color components in the first background area exceeding a second threshold.

13. A non-transitory computer-readable storage medium, having stored thereon a computer program that, when executed by a processor, causes the processor to implement an image processing method, the method comprising:
capturing a first master image according to a first exposure time by using a first camera, and capturing a slave image according to the first exposure time by using a second camera simultaneously; and composing the first master image and the slave image to obtain a first image;
responsive to a result of comparison that brightness of a shooting scene is less than a preset threshold, determining a second exposure time according to a preset algorithm and the brightness, wherein the second exposure time is longer than the first exposure time;
responsive to a result of comparison that the brightness is greater than or equal to the preset threshold, starting a normal shooting mode and determining the second exposure time as a preset exposure time corresponding to the normal shooting mode;
capturing a second master image according to the second exposure time by using the first camera or the second camera;
determining a first foreground area and a first background area of the first image and determining a second foreground area of the second master image;
performing image fusion processing on the second foreground area and the first foreground area to generate a third foreground area, the third foreground area being of a high dynamic range image; and
performing blurring processing on the first background area, and composing the third foreground area and the first background area subjected to the blurring processing to generate a target image which is the high dynamic range image.

* * * * *